United States Patent

Pablo

[11] Patent Number: 6,055,926
[45] Date of Patent: May 2, 2000

[54] LIQUID ENZYME DOSER

[75] Inventor: Vega Plazas Pablo, Barcelona, Spain

[73] Assignee: Fontcuberta 1 Mangra, S.A., Manlleu, Spain

[21] Appl. No.: 08/776,560

[22] PCT Filed: Jun. 4, 1996

[86] PCT No.: PCT/ES96/00127

§ 371 Date: Apr. 28, 1997

§ 102(e) Date: Apr. 28, 1997

[87] PCT Pub. No.: WO96/39650

PCT Pub. Date: Dec. 12, 1996

[30] Foreign Application Priority Data

Jun. 5, 1995 [ES] Spain ................................ P9501115/3

[51] Int. Cl.[7] ............................... B05B 1/30; B05B 1/24; A61J 3/00

[52] U.S. Cl. .............................. 118/24; 118/303; 118/313; 118/695; 426/302; 426/442; 426/805; 427/2.14

[58] Field of Search ..................................... 426/281, 302, 426/422, 442, 805, 519; 427/2–14; 118/13, 24, 313, 695, 303, 300

[56] References Cited

U.S. PATENT DOCUMENTS

| | | | |
|---|---|---|---|
| Re. 32,695 | 6/1988 | Nahra et al. | 426/521 |
| 4,009,286 | 2/1977 | Moll et al. | 426/521 |
| 4,355,639 | 10/1982 | Di Salvo | 128/214 R |
| 4,411,047 | 10/1983 | Norton | 426/281 |
| 5,423,738 | 6/1995 | Robinson et al. | 604/4 |
| 5,549,009 | 8/1996 | Zaschel | 73/861.355 |
| 5,609,908 | 3/1997 | Voss | 118/313 |
| 5,612,188 | 3/1997 | Shuler | 435/29 |
| 5,645,899 | 7/1997 | Unterberger | 118/642 |
| 5,710,466 | 1/1998 | Allen et al. | 310/40 MM |

FOREIGN PATENT DOCUMENTS

| | | |
|---|---|---|
| 2628340 | 9/1989 | France . |
| 2003958 | 12/1988 | Spain . |
| 1572761 | 8/1980 | United Kingdom . |

*Primary Examiner*—Diana Dudash
*Attorney, Agent, or Firm*—Ladas & Parry

[57] ABSTRACT

Liquid-enzyme-dosing device which consists in projecting the enzymatic liquid by injection onto the end product. Dosing is highly accurate, metered by an in-piping positive-displacement flow rate meter. Regulation of dosing is carried out using a motorized microregulation valve. Monitoring of dosing takes place in a microprocessor which combines all the functions of the apparatus.

16 Claims, 4 Drawing Sheets

LIQUID ENZYME DOSER

FIELD OF THE INVENTION

The subject of the invention in a monobloc apparatus for dosing enzymes, for the addition, dosing or admixing of enzymes in the liquid state in the process of preparing feed, preferably post-pelletized feed.

PRIOR ART

From the biochemical point of view the addition of particular enzymes in the manufacture of compound feed could be defined as the admixing of a substance capable of activating or facilitating a chemical reaction which allows the conversion or breakdown of a substance.

Like many other biological functions, animal digestion in the sum of a set of chemical transformations activated by enzymes which act on ingested foods.

At the present time, new animal nutrition techniques incorporate the use of various types of enzymes, making it possible to increase the nutritional value of feed by improving its digestibility and thereby achieving large yields and high conversion ratios.

It is therefore logical to facilitate the dosing of the said enzymes in liquid form for the manufacturer of compound feed by furnishing him with an apparatus which allows him to effect the said addition correctly, with the greatest ease of installation, handling, robustness and accuracy.

In order to determine the type of dosing system, we ought to consider two points:

Any enzymatic product, be it of solid or liquid type, possesses the property of being a heat-sensitive product, that is to say that, when subjected to high temperatures during the various manufacturing processes, they are to a large extent destroyed.

The present trend of manufacturers of feed for young animals in the mainly pig and poultry sector is to produce extruded, expanded and pelletized feed (at the very least pelletized). It is in this type of feed and for these young animals that the addition of enzymes in the liquid state offers better results. Admixing the said liquids into pre-pelletized meal would destroy some of the enzymatic properties on account of the high temperatures to which they would be subjected in this phase of the manufacturing process.

Bearing in mind that the quantities of enzymes in the liquid state to be admixed will be relatively small (of the order of 600 cc per tonne of manufactured feed) and that the entire spectrum of dosing apparatuses of the monobloc type has been devised for small reservoirs of liquid in the form of 50–100-l drums, the main characteristics which the said apparatuses should possess could be determined as follows:

High-precision dosing in l/minute;

Ease of installation and handling;

Robustness of the plant components;

Almost zero maintenance.

In the patent ES2003958, the proprietor, Mangra S. A., has already protected a continuous-mode system for dosing and admixing fluids in the process for pelletizing compound feeds. This system, however, was designed to work while hot during the pelletization process since the substance to be dosed, molasses, was not heat-sensitive.

Most of the dosing apparatuses currently on the market use pulsed dosing pumps, either of the plunger or membrane type. The said pumps are adjusted via a control located on the actual dosing or body unit. Verification that each pulse is equivalent to a specified rate of atomization has to be carried out via in-situ tests. This system entails the following drawbacks:

It presupposes that each pulse determines a flow rate, without there being a flow rate meter to verify this;

Regulation is manual, there being no automatic monitoring;

Regular tests need to be carried out to control dosing quality.

On the European market there are pumps similar to those used in the dosing system which is the subject of the invention, but they are built into dosing devices which lack microregulation and electronic data processing.

Likewise, known injectors have spraying angles which vary solely as a function of the working pressure and do not embrace all the sprinkling possibilities offered by the components of the enzyme-dosing system which is the subject of the invention.

SUMMARY OF THE INVENTION

The foregoing considerations lay down the guideline that the dosing system will be a continuous addition of enzymes, to be carried out after the pelletization process, using a product that has already been pelletized and chilled.

Consequently the system will consist of an admixing of enzymes which will be accomplished by utilizing the discharging of the pellet as it exits the chiller, either as it drops or during transportation.

For this purpose a specific product-flow sensor will be fitted which will advise when to begin dosing and also when to terminate it.

The dosing of enzymes will be monitored electronically in an automatic manner by a microprocessor which will combine the following functions:

Directly reads machine production either on the basis of the density of the product or continuous weighing;

Adjusts the sprinkling flow rates by actuating a microregulation valve, processing the flow rates obtained from it by means of a flow rate meter;

Stores and processes incidents (alarms, checks, etc.) and parameters (times, tonnes manufactured, etc.).

DETAILED DESCRIPTION OF THE INVENTION

It will be necessary to determine the tonnes/hour of product transported by the conveyances so as thereby to calculate the l/minute which have to be added. (0.6 l of enzymes per tonne of product, approx.).

Dosing will be accomplished by enzyme being sprayed through an injector or injectors with one or more specific spraying angles for sprinkling the entire width of the conveyances. The working or atomization pressure will be achieved with a magnetic-drag gear pump. The rate of admixing will be regulated by a microregulation valve. The said rates will be metered with a precision volumetric gauge and displayed using a digital l/minute indicator so as subsequently to obtain their total in liters using their relevant totalizer gauge.

The preferred embodiment of the invention will now be described with the aid of the following figures.

Figure 1:
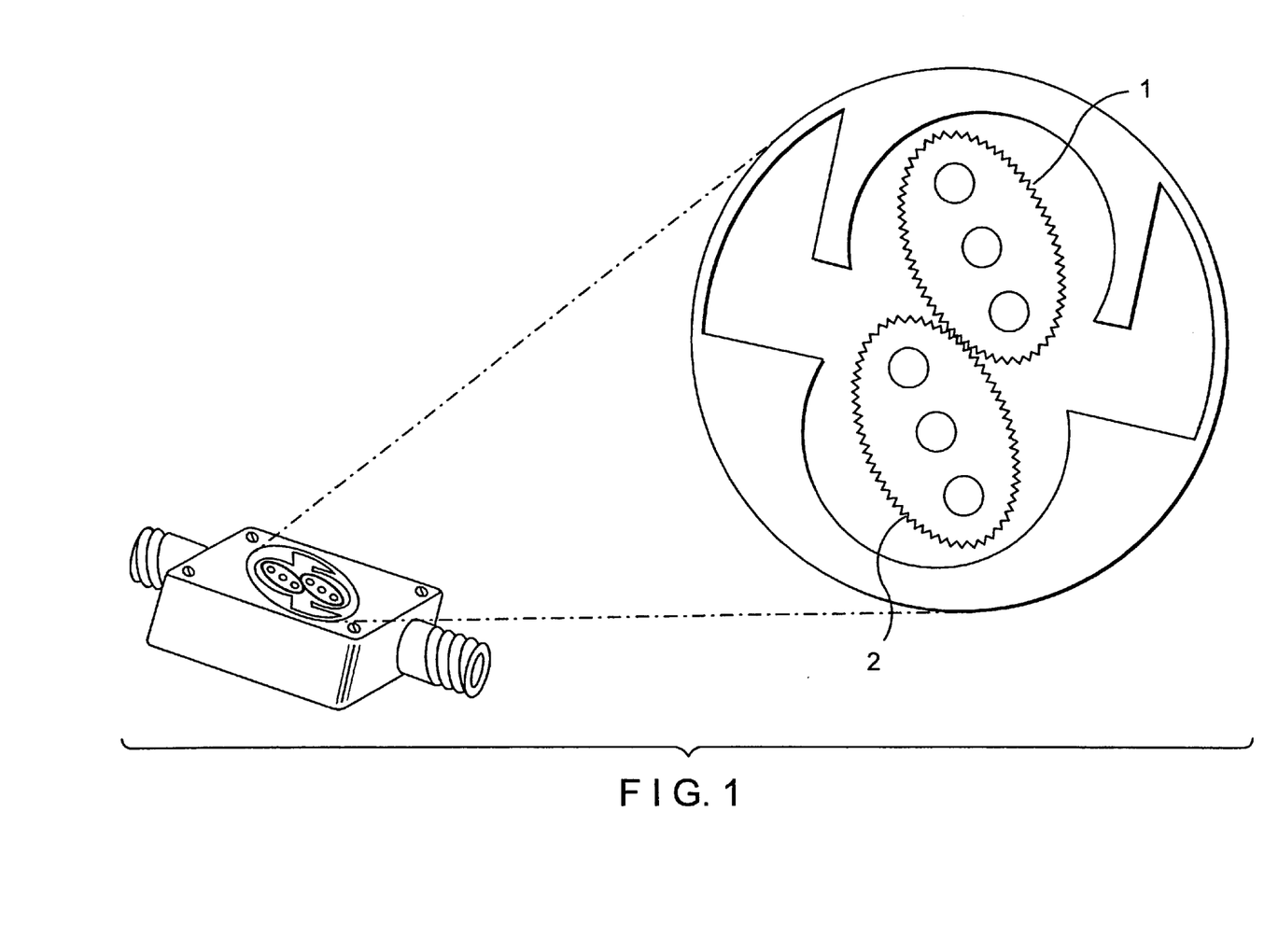
FIG. 1 Detail of the volumetric flow meter

There now follows a detailed description of the invention on the basis of the various elements of the apparatus, taken separately by means of the figures:

FIG. 1:
(1) PINION WITH MAGNETS
(2) PINION WITH HOLLOW ORIFICES

Figure 2:
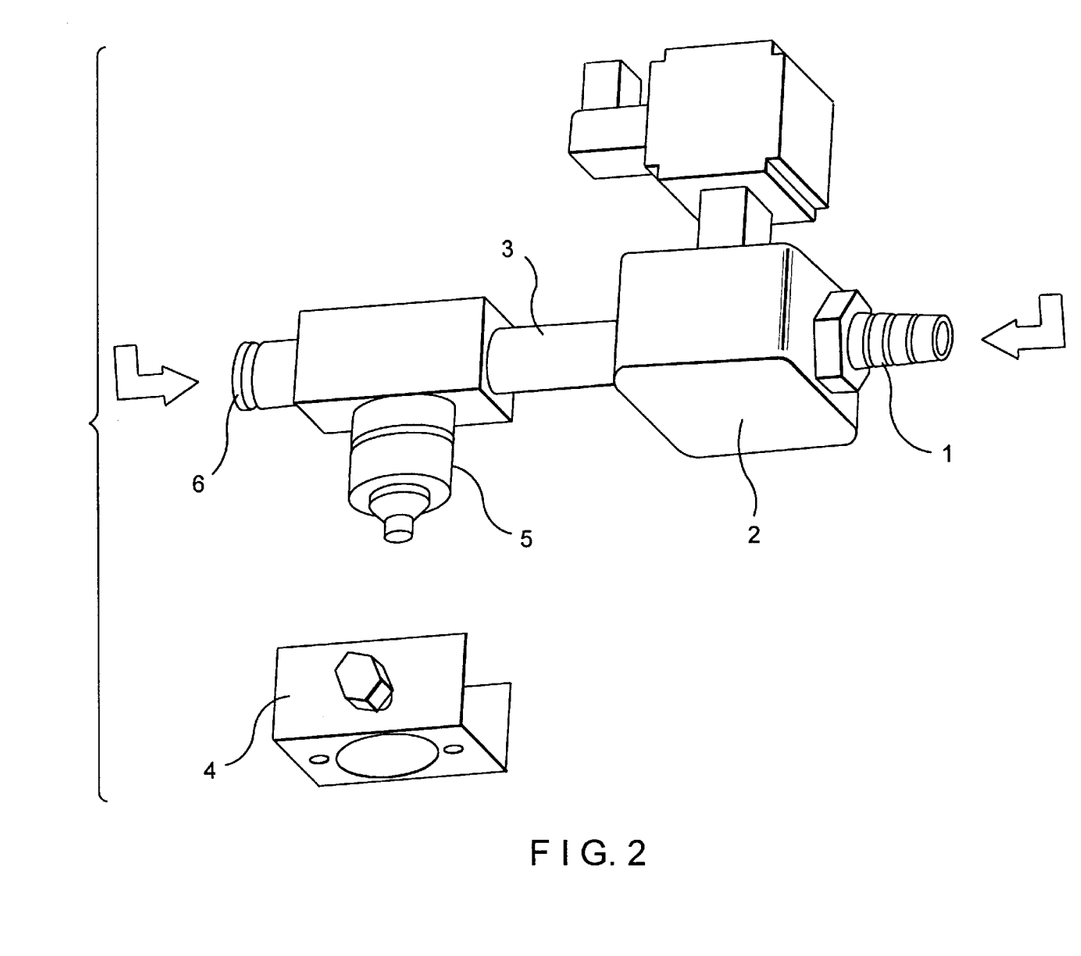
FIG. 2 Detail of the flow valve/injector body assembly

FIG. 2:
(1) ENZYMATIC LIQUID INLET JUNCTION
(2) ELECTRIC FLOW VALVE
(3) INJECTOR GUIDE PIPE
(4) INJECTOR SUPPORT
(5) INJECTOR
(6) AIR INLET NOZZLE

Figure 3:
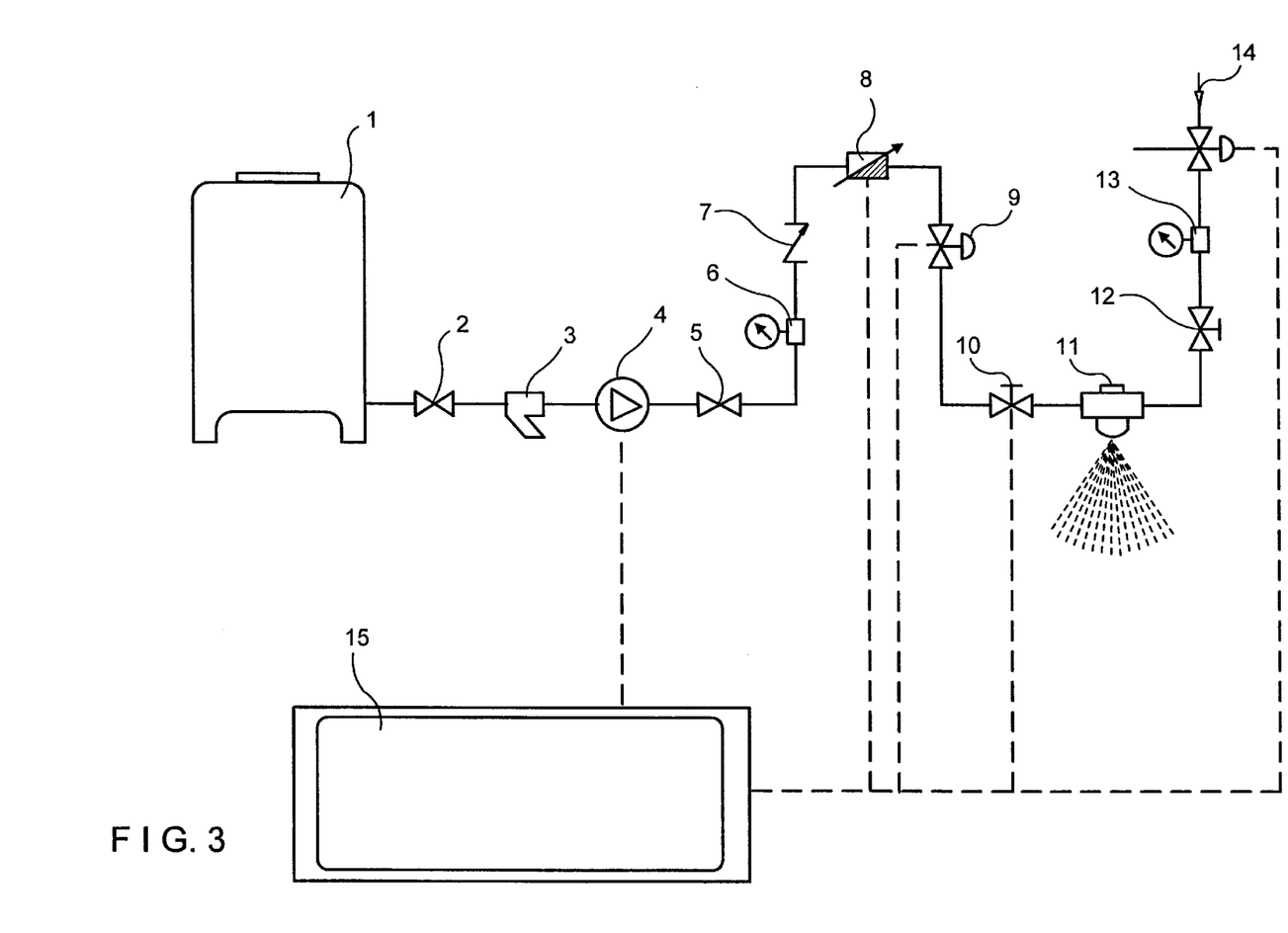
FIG. 3 General operating diagram

FIG. 3:
(1) ENZYME VESSEL: with monitored temperature
(2) VALVE 1
(3) FILTER
(4) PUMP
(5) MANUAL VALVE
(6) MANOMETER 1
(7) NON-RETURN VALVE
(8) FLOW RATE METER
(9) MICROREGULATION VALVE
(10) VALVE 2
(11) INJECTOR
(12) VALVE 3
(13) MANOMETER 2
(14) VALVE REGULATING CIRCUIT PRESSURE
(15) MICROPROCESSOR: Monitors dosing automatically General Operating Diagram (FIG. 3)

Via an in-line continuous weighing system it is possible to determine the production in MT/h of feed pellets. This data item is entered into the microprocessor (15). Starting from the tank (1) for storing the enzymatic liquid, the dose of enzyme to be admixed with the pellet is extracted as the pellets are produced. Extraction of the enzyme liquid is accomplished by means of the gear pump (4), the function of which is to maintain a constant pressure of previously filtered fluid, and suction, at the inlet of the microregulation valve (9). The said valve will be operated so as to monitor the appropriate injection rates which are constantly measured by a high-resolution flow rate meter (8) which is extremely accurate. The microprocessor (15) will be responsible for integrating these three functions. It will read the production of feed and will dose the enzymes, monitoring the microregulation valve so as to obtain an instantaneous fluid flow rate read by the high-resolution flow rate meter (8). The admixing of the enzymatic liquid will be carried out by pressure atomization, with or without the aid of compressed air, through one or more injectors (11). The planar spraying angles will be variable, with the objective of sprinkling the product homogeneously.

Non-limiting Example of a Preferred Embodiment of the Invention

Figure 4:
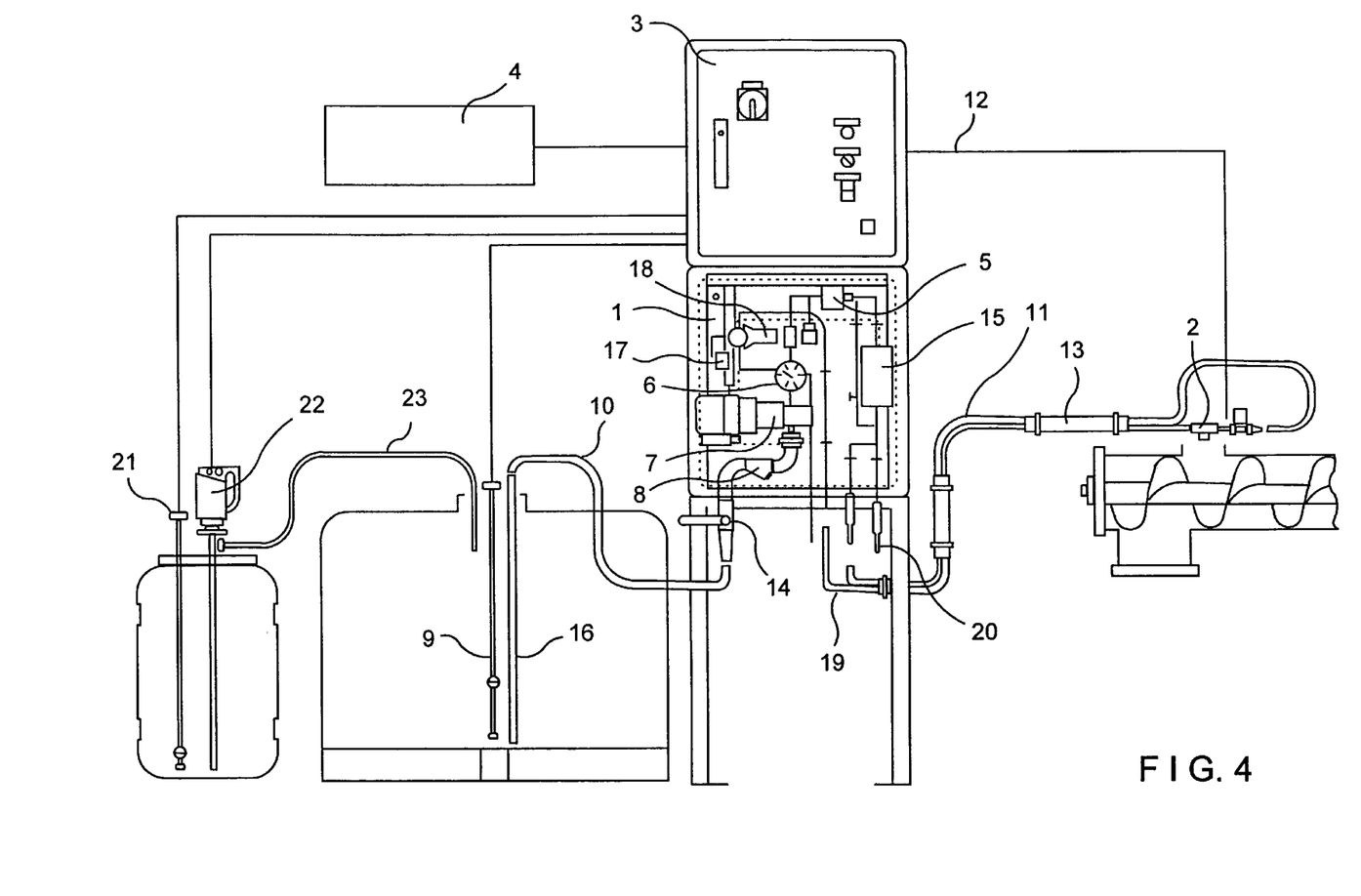
FIG. 4 Example of the arrangement of the various components incorporated.

FIG. 4:

This figure describes a set-up and arrangement of the component elements of the apparatus by way of a non-limiting example of an embodiment of the invention.

(1) APPARATUS SUPPORT BASE PLATFORM
(2) ELECTRICALLY-OPERATED VALVE/ATOMIZATION INJECTOR ASSEMBLY

This assembly is detailed in FIG. 2. The on or off electrically-operated valve for injecting the fluid is a two-way valve which is normally closed and of sufficient bore to prevent possible throttling of the flow.

The injection body is formed by a flat spraying nozzle with tapered edges for obtaining high uniformity of distribution (spraying angles of between 25 and 110°). The spraying tips are of the interchangeable type. The spraying rates, evaluated with $H_2O$, are shown in the table below:

| PRESSURE | 1 bar | 2 bar | 3 bar | 4 bar | 5 bar |
|---|---|---|---|---|---|
| C1 0050 | 0.11 | 0.16 | 0.20 | 0.22 | 0.25 l/min |
| C1 01 | 0.23 | 0.32 | 0.39 | 0.45 | 0.50 l/min |

The electrically-operated valve/injector assembly has a stainless-steel pipe-like extension with fastening facility (FIGS. 2, 4) so that the various sprinkling sections can be displaced and adjusted in each particular case.

The selection of dosing injectors will be based on two types, one for dosings of the order of from 100 to 250 cc/minute (C1 0050) and the other for dosings of from 250 to 500 cc/minute (C1 01).

The fitting of one or the other will logically depend on the quantity, in tonnes per hour, of finished product taken away by the conveyance and to which injection will be applied.

The selection of one or the other will thus depend on the quantities or margins thereof which it is desired to dose.

For example, assume a conveyance of finished product produced at a rate of 15 MT/h and that the quantity of enzyme liquid is to be 0.6 l per tonne.

0.6×15=9 l/h=150 cc/minute. In this case, C1 0050 will be used.

Assume instead a conveyance of finished product produced at a rate of 30 MT/h, and that the quantity of enzyme liquid is to be 0.69 l per tonne.

0.69×30=20,700 l/h=345 cc/minute. In this case, C1 01 will be used.

In either case, having determined the rating of the injector, dosing will be carried out by increasing or decreasing the flow rate using the microregulation valve.

(3) ELECTRICAL POWER BOARD

The said board is located in the same base platform of the apparatus. It will contain all the possible connections of the elements to be monitored, including the monitoring link with the front panel, or the link to a hypothetical panel or remote control board, as the case may be. The said board will contain:

Terminals for the mains inlet connection;

Magnetothermal protection and contactor for the admixing pump;

Control relays and isolating transformer;

Connection terminals for: minimum drum level, volumetric flow rate meter, injection electrically-operated valve and automatic dosing connection;

All of the above electrical equipment will be mounted in a self-extinguishing, double-insulation modular casing with high resistance to chemical agents and high temperatures (150° C.) and manufactured in reinforced polyester.

(4) DOSING CONTROL MICROPROCESSOR This is the monitoring part of the dosing apparatus. Just like the entire assembly, this will be situated as closely as possible to the points of injection. If by chance there is a remote control board, it would be located according to the choice of the operator responsible for monitoring dosing. The contents of the control board correspond with the functions to be undertaken by the microprocessor and which are as follows:

Emergency breaker switch and apparatus-on switch;

Illuminated on and off buttons for the admixing pump;

Buttons for relieving/throttling the microregulation valve. Illuminated indicator buttons for dosing alarms;

Illuminated indicator warning of minimum level in the fluid container;

Liter totalizer gauge;

Indicator/monitor of l/min with monitoring of maximum and minimum dosing alarms;

If there is remote control, all of the control elements will be placed in a monobloc metal cabinet, its sides being constructed from a single piece and bent double. Painted outside and inside with textured polyester-epoxy resin.

COUNTING AND TOTALIZING OF DOSING

Any HIGH-PRECISION flow rate gauge or meter (FLOW RATE METER) of the OVAL GEAR or COG type requires high resolution since, when metering the fluid flowing through, a PULSE STRING of the order of 2000 to 2300 PULSES is obtained for each liter of product.

All of this flow rate metered in the form of PULSES will have to be translated and reflected in an analytical form as instantaneous quantities of cc per minute, as will its total in liters.

Flow rate meter pulse converter with instantaneous indication of flow rate.

The pulses emitted by the flow rate meter will have to be forwarded to a frequency/current (mA) converter, monitored by the microprocessor which will fulfill a dual function:

FUNCTION A: Converting the pulse frequency into a variable current of from 0 to 20 mA which correctly processed we shall obtain a reading of INSTANTANEOUS FLOW RATE IN CC/MINUTE.

FUNCTION B: In parallel with the above function there is an pled output signal of identical frequency to the frequency of the input. It is then possible with these pulses to count them later in conjunction with the density correction factor and TO TOTAL THEM IN LITERS of dosing.

Dosing totalizer and its programming.

After processing by the (optocoupled) CONVERTER, the frequency of the pulses generated by the flow rate meter when the fluid passes through it needs to be received by the totalizer.

Any precision meter, such as the one under discussion, generates a large quantity of PULSES/LITER. If we were interested in monitoring a dosing in KILOGRAMS, it would be necessary to multiply the said pulse frequency by a correction factor directly related to the density of the fluid so as thereby to translate liters into kilograms.

This is the chief function of the DOSING TOTALIZER. It consists of a programmable gauge/totalizer with a correction scale or factor (pulse divider) which makes it possible to convert PULSES/LITER into PULSES/KILOGRAMS.

The said gauge possesses a wide spectrum of processes and can be programmed for various actuation areas.

Indication of instantaneous flow rates.

Use will be made of a digital indicator with two alarm preselects or levels to display the flow rates, in CC/MINUTE, which will be dosed at any time in the enzyme-addition process.

The signal input will be from 4 to 20 mA with a digital read out of between 0 and 1000 CC/MINUTE. Its two alarm outputs, correctly preselected, will give two alarm levels.

Assume that it is desired to dose 630 cc/minute and establish dosing error margins of 20 cc/minute and therefore set the minimum permitted dosing alarm pre-selector at +610 and that for the maximum dosing alarm at +650. The permitted error will be with these +/−20 cc dosing levels.

(5) FLOW RATE METER

The said meter operates on the principle of positive-displacement volumetric metering in piping. It consists of two oval wheels housed in a chamber through which the liquid flows. These oval wheels are gears of oval outline which are forced to rotate continuously through the thrust of the liquid flowing through, allowing the passage of cyclic volumes for each revolution of the said wheels (FIG. 1).

The accuracy of metering, using this system, is one of the highest which is presently available in the market given, additionally, that it is virtually unaffected by the variation in the density or in the viscosity of the fluid. With the subject of the invention an accuracy of ±0.2% of the actual volume is obtained for any condition of the fluid and any metering rating.

The sensor element (meter) will be placed in the piping and, by means of a static pulse generator placed against the body, it will deliver signals of variable frequency, depending on the flow rates, to an electronic receiver placed remotely which, in actual fact, is the element for reading the volume which has flowed through. The magnetically generated pulses (IMP/L) are received, processed and converted into a user-friendly read-out via gauges providing a direct indication of flow rate in real time.

To summarize, it could be said that the said meter possesses the following general technical characteristics:

HIGH ACCURACY;

MINIMUM LOSS OF HEAD ON ACCOUNT OF THE ACTUAL CONSTRUCTION;

VERSATILE/COMPATIBLE, being unaffected by vortices or turbulence in the piping and therefore requiring no straight sections and capable of being placed immediately at the outlet of a pump.

It has a 0.5–50 liters/hour metering rating, with maximum working temperatures of −10° C. to +70° C., a working pressure of 5 kg/cm$^2$ and an accuracy of ±0.5% of actual volume.

(6) PRESSURE INDICATING MANOMETER

This will be located on the front panel of the dosing cabinet and joined to the admixing piping with a flexible joint. It is a manometer with glycerine bath, the best choice in pressure metering applications with rapid and large changes of head, and pump vibrations and pulsations. It has a metering rating of 0–10 bar.

(7) ADMIXING ELECTROPUMP

Magnetic-drag rotary gear pump devised uniquely and exclusively for viscous and chemically abrasive liquids, linear dosings; low noise level and highly robust. It has a maximum working pressure of 7–12 bar.

(8) SPRAYING FILTER

This is an impurities filter, for fluid dosing, giving high performance in terms of reliability and accuracy. It is essential in this type of dosing to filter out the impurities which could to a large extent impair the FLOW RATE METER and also the ATOMIZATION INJECTORS. It offers the option of easy and rapid exchange of the filtering MESH with four types of pitch. It also possesses high strength at the 16–20-bar working pressure.

(9) MINIMUM LEVEL and MACHINE TRANSFER

Level detector with magnetic float. This is constructed from two thin leaves of ferromagnetic material separated by a narrow gap and hermetically enclosed in a glass ampoule filled with inert gas so as to avoid contaminants and oxidation of the contacts. Maximum pressure 50 bar.

(10) FLEXIBLE SPRAYING ROSE

The flexible spraying hose will be joined to a rigid PVC straight which must have a non-return valve at its extreme end. The hose is reinforced with polyester mesh. Maximum nominal pressure 10 bar; maximum temperature +70° C.

(11) FLEXIBLE ADMIXING HOSE (12) ELECTRICAL CONNECTION CABLES

The VVFV/RVFV-type hoop-iron armoured cable is the appropriate cable when flexibility criteria are not of maximum importance but where the level of mechanical protection of the cable against knocks, squashing, rodents, etc., is fundamental. This cable has crosslinked polyethylene insulation thereby permitting greater power transmission for equal cross section. The electronic signal leads are made from screened, flexible cable with characteristics similar to the previous type.

(13) GALVANIZED-STEEL PIPING/CLAMPS

Galvanized-steel lengths of straight pipe of greater diameter than that of the injection hose will be supplied for the installation of the admixing piping on the atomization body so as to produce a two-pipe gauged system, the said lengths being fastened, until they reach the atomizing element, with their relevant clamps, either welded to metal supports or fastened to structural walls using nails.

(14) MANUAL FLOW VALVE

The purpose of this is to create a bypass to provide the option for quality control of dosing using the sampling taps.

(15) MICROREGULATION VALVE

The purpose of the apparatus is mainly concerned with the addition of a specific quantity of ENZYMATIC LIQUID in cc per minute. The said quantities will vary between 100 and 300 cc/minute. To achieve this requires an injection pump which gives a constant working pressure, accurate volume metering with which the said quantities can be measured and, of course, a MICROREGULATION valve capable of setting the appropriate amount, expressed as grammes, of injection for each application.

Control of the said valve may be motorized so that it can be driven remotely.

Regulation by rotary control of up to 20 actuator turns, controlled by a motorized positioning actuator.

Maximum working pressure 5000 psi. Temperature range −29° C.−+121° C.

(16) SPRAYING PIPE/NON-RETURN VALVE ASSEMBLY

In order to facilitate the process of discharging the containers or drums and to prevent possible problems which might arise through twisting or excessive mobility of the spraying tip, a straight and rigid length of PVC spraying piping has been constructed, the relevant non-return valve being screwed onto its end. This valve is of the foot type in order to keep the piping full for correct dosing. Essential for the type of flow rate meter employed in the said plant. Maximum temperature 240° C.

(17) AIR FLOW ELECTRICALLY-OPERATED VALVE

This is three-way, normally closed, with a working temperature of −10−+140° C.

(18) AIR PRESSURE REGULATOR

Membrane which stabilizes the regulated pressure (0–4 bar) when the line pressure varies. High flow rate with restricted pressure drop. Rapid release of excess pressure. Maximum inlet pressure 13 bar. Maximum service temperature 50° C.

(19) AIR PIPING

Nylon pipe which withstands high air pressures.

(20) SAMPLING TAP

The fitting of sampling taps is essential for any type of dosing in order to carry out the relevant quality controls on the quantities added as well as on the extraction of product specimens. BALL VALVES are fitted for the said function. These will be actuated manually so as to facilitate processes for taking specimens, calibrations and replacement of any elements in the piping. Maximum pressure 1000 psi, maximum temperatures −25° C.−+232° C.

(21) MINIMUM VESSEL LEVEL

This is an indicator of the minimum level of pure liquid undiluted, enzymes in the vessel.

(22) CHARGING PUMP

The function of this is to permit the transfer of pure enzyme from the initial vessel into the dilution tank.

(23) FLEXIBLE CHARGING HOSE

The enzyme may obviously be dosed directly in the desired concentration, so the intermediate dilution tank and the attendant charging and level control systems must therefore be interpreted as an optional addition to the apparatus. In general, FIG. 4 shows an embodiment of the invention which must be taken in its widest context, without the said example serving as a restrictive interpretation of the underlying inventive principle.

I claim:

1. An apparatus for dosing a liquid enzyme comprising:
   a) at least one thermoregulated vessel for storing the liquid enzyme;
   b) spraying means comprising an injector for spraying the liquid enzyme onto a product that is conveyed beneath the injector;
   c) a dosing circuit for providing flow communication for the liquid enzyme between the thermoregulated vessel and the spraying means;
   d) extracting means for pumping the liquid enzyme from the vessel to the spraying means and for maintaining a constant fluid pressure in the dosing circuit;
   e) microregulation valve means, including a microregulation valve in the dosing circuit, for regulating flow of the liquid enzyme to the injector to a rate of between about 100–300 cc/minute;
   f) flow meter means in the dosing circuit for metering a rate flow of the liquid enzyme to the injector with an accuracy of about ±0.2% by volume of liquid enzyme flowing to the injector without regard to a density or viscosity of the liquid enzyme; and
   g) electronic control means for monitoring the flow meter means and for displaying the rate of flow of the liquid enzyme to the injector.

2. An apparatus as claimed in claim 1, wherein the extracting means comprises a magnetic-drag electropump for viscous and chemically abrasive liquids which has a maximum working pressure of 12 bar.

3. An apparatus as claimed in claim 1, wherein the extracting means comprises a filtration system.

4. An apparatus as claimed in claim 3, wherein the filtration system comprises a mesh with a high strength at a working pressure of 16 bar and at 20° C.

5. An apparatus as claimed in claim 1, wherein the microregulation valve comprises a motorized valve which can be adjusted through rotary control of up to 20 turns of an actuator, and has a maximum working pressure of 5000 psi and a working temperature range from −29° C. to +121° C.

6. An apparatus as claimed in claim 5, wherein the microregulation value is adjustable by remote control.

7. An apparatus as claimed in claim 1, wherein the flow meter means comprises a flow rate meter that is a positive displacement flow rate meter/gauge with a metering rating of 0.5–50 l/h, which operates at a maximum working pressure of 5 kg/cm$^2$ and a temperature of −10° C. to +70° C.

8. An apparatus as claimed in claim 7, wherein the flow rate meter comprises a series of pairs of oval cog wheels arranged in piping traversed by the liquid enzyme to be metered, which move in a rotary and continuous manner through the thrust of fluid flowing through, generating a series of electrical signals which are sent to a frequency/current converter.

9. An apparatus as claimed in claim 1, wherein the spraying means comprises a three-way air-flow electrically-operated valve with a working temperature rating which varies between −10° C. and +140° C.; an air-pressure regulator with a rating of 0–4 bar; a two-way enzymatic liquid injection on and off electrically-operated valve with a temperature rating and a working pressure of −30° C. to +140° C. and 0.3 to 20 atmospheres respectively; and a gaseous-fluid pneumatic-atomizing injector having a nozzle with tapered edges which produces a planar spray with a flow rate of between 0.1–0.5 l/min and spraying angles of between 25° and 110°.

10. An apparatus as claimed in claim 1, wherein the electronic control means comprises a flow indicator for receiving signals from the flow rate meter means and relays for opening and closing the microregulation valve.

11. An apparatus as claimed in claim 1 further comprising means for measuring a weight of the product that is conveyed beneath the injector, said electronic control means actuating the microregulation valve to adjust the rate of flow of the liquid enzyme to the injector.

12. A method for applying a liquid enzyme to a product comprising conveying the product to the apparatus of claim 1 so that the product passes beneath the injector of the apparatus, and causing the apparatus to spray the liquid enzyme onto the product in a desired dose.

13. A method as claimed in claim 11, wherein the product comprises food pellets.

14. A method as claimed in claim 13 wherein the apparatus sprays the liquid enzyme onto the food pellets in an amount in the order of about 600 cc per ton of food pellets.

15. An apparatus for dosing a liquid enzyme comprising:
a) at least one thermoregulated vessel for storing the liquid enzyme;
b) spraying means for spraying the liquid enzyme onto a product that is conveyed beneath the spraying means, the spraying means comprising (a) a gaseous-fluid atomizing injector having nozzle means for producing a planar spray with a flow rate of between 0.1–0.5 l/min and spraying angles of between 25° and 110° and (b) an on and off electrically-operated valve,
c) a dosing circuit for providing flow communication for the liquid enzyme between the thermoregulated vessel and the spraying means;
d) extracting means for pumping the liquid enzyme from the vessel to the spraying means;
e) microregulation valve means, including a microregulation valve in the dosing circuit, for regulating flow of the liquid enzyme to the injector to a rate of between about 100–300 cc/minute;
f) flow meter means in the dosing circuit for metering a rate flow of the liquid enzyme to the injector; and
g) electronic control means for monitoring the flow meter means and for displaying the rate of flow of the liquid enzyme to the injector.

16. An apparatus as claimed in claim 15, wherein the nozzle means comprises a first and second nozzle, said second nozzle being mountable in the injector when the first nozzle is detached from the injector, said second nozzle providing the injector with a different spraying rate than said first nozzle.

* * * * *

UNITED STATES PATENT AND TRADEMARK OFFICE
CERTIFICATE OF CORRECTION

PATENT NO. : 6,055,926
DATED : May 2, 2000
INVENTOR(S) : Pablo Vega Plazas

It is certified that error appears in the above-identified patent and that said Letters Patent is hereby corrected as shown below:

On the title page: Item [73] delete "Fontcuberta 1"

On the title page: Item [75] Inventors: insert --Pablo-- before "Vega" and delete "Pablo" after "Plazas".

Signed and Sealed this

Thirtieth Day of January, 2001

Attest:

Q. TODD DICKINSON

Attesting Officer

Director of Patents and Trademarks